(12) United States Patent
Avci

(10) Patent No.: US 10,914,634 B2
(45) Date of Patent: Feb. 9, 2021

(54) HIGH-RESOLUTION INTEGRATED-OPTICS-BASED SPECTROMETER

(71) Applicant: IXA AMC Office / Academic Medical Center, Amsterdam (NL)

(72) Inventor: Bakiye Imran Avci, Amsterdam (NL)

(73) Assignee: Academisch Medisch Centrum, Amsterdam (NL)

( * ) Notice: Subject to any disclaimer, the term of this patent is extended or adjusted under 35 U.S.C. 154(b) by 41 days.

(21) Appl. No.: 16/335,587

(22) PCT Filed: Sep. 26, 2017

(86) PCT No.: PCT/IB2017/055873
§ 371 (c)(1),
(2) Date: Mar. 21, 2019

(87) PCT Pub. No.: WO2018/055605
PCT Pub. Date: Mar. 29, 2018

(65) Prior Publication Data
US 2020/0025616 A1    Jan. 23, 2020

Related U.S. Application Data

(60) Provisional application No. 62/399,729, filed on Sep. 26, 2016.

(51) Int. Cl.
*G01J 3/453* (2006.01)
*G01J 3/02* (2006.01)

(52) U.S. Cl.
CPC ........... *G01J 3/4531* (2013.01); *G01J 3/0259* (2013.01)

(58) Field of Classification Search
CPC .. G01J 3/0259; G01J 3/45; G01J 3/453; G01J 3/4531; G01J 3/4532
See application file for complete search history.

(56) References Cited

U.S. PATENT DOCUMENTS 6,175,671 B1 * 1/2001 Roberts .................. B82Y 20/00
359/337
10,006,809 B2 * 6/2018 Hu ......................... G02F 1/3136
(Continued)

OTHER PUBLICATIONS

Yuqing Jiao et al., "InAs/InP(100) quantum dot waveguide photodetectors for swept-source optical coherence tomography around 1.7 pm", "Optics Express", Jan. 31, 2012, Publisher: Optical Society of America, pp. 3675-3692, vol. 20, No. 4.
(Continued)

*Primary Examiner* — Michael A Lyons
(74) *Attorney, Agent, or Firm* — Kaplan Breyer Schwarz, LLP

(57) ABSTRACT

A high-resolution single-chip spectrometer is disclosed. Embodiments of the present invention are analogous to Fourier-transform spectrometers; however, embodiments of the present invention have no moving parts. An illustrative embodiment is a spectrometer having a nested plurality of Mach-Zehnder interferometers (MZIs), where all MZIs share at least one surface-waveguide section in each of its sample and reference arms. The light signals in the sample and reference arms are tapped at a series of discrete locations along their length via electro-optically-controlled directional couplers, which are separated by uniform-length waveguide portions in each arm, but where the uniform lengths are different in the sample and reference arms providing a different path-length difference for the arms of each MZI. The tapped light from the sample and reference arms is recombined at a low-loss beam combiner to generate a distribution of optical power as a function of time-delay difference in the arms.

19 Claims, 11 Drawing Sheets

(56) References Cited

U.S. PATENT DOCUMENTS

| | | | |
|---|---|---|---|
| 2006/0034569 A1 | 2/2006 | Shih et al. | |
| 2010/0245831 A1 | 9/2010 | Okamoto | |
| 2011/0170161 A1* | 7/2011 | Gill | G02F 1/025 |
| | | | 359/259 |
| 2012/0050744 A1* | 3/2012 | Takada | G01J 3/4532 |
| | | | 356/451 |
| 2014/0078510 A1 | 3/2014 | Rubio et al. | |
| 2014/0118748 A1 | 5/2014 | Rubio et al. | |
| 2014/0125983 A1 | 5/2014 | Nitkowski et al. | |
| 2014/0375999 A1* | 12/2014 | Okamoto | G01J 3/4532 |
| | | | 356/451 |
| 2014/0376000 A1 | 12/2014 | Swanson et al. | |
| 2017/0052016 A1 | 2/2017 | Sancho et al. | |
| 2019/0003820 A1 | 1/2019 | Van et al. | |
| 2019/0257640 A1 | 8/2019 | Avci | |

OTHER PUBLICATIONS

Okamoto, Katsunari, "Multimode Interference (MMI) Device", "Fundamentals of Optical Waveguides", dated 2005, Publisher: Elsevier Science, pp. 46-55, http://ebookcentral.proquest.com/lib/epo-ebooks/detail.action?docID+269548.

K. Takiguchi et al., "Integrated-optic variable delay line and its application to a low-coherence reflectometer", "Optics Letters", Oct. 15, 2005, Publisher: Optical Society of America, pp. 2739-2741, vol. 30, No. 20.

Gunay Yurtsever et al., "Photonic integrated Mach-Zehnder interferometer with an on-chip reference arm for optical coherence tomography", "Biomedical Optics Express", DOI: 10.1364/BOE.5.001050, Mar. 3, 2014, Publisher: Optical Society of America, pp. 1050-1061, vol. 5, No. 4.

Duc Nguyen V et al: "Integrated-optics-based swept-source optical coherence tomography", Optics Letters, Optical Society of America, US, vol. 37, No. 23, Dec. 1, 2012 (Dec. 1, 2012), pp. 4820-4822.

Bauke W. Tilma et al., "Integrated Tunable Quantum-Dot Laser for Optical Coherence Tomography in the 1.7 (Mu) Wavelength Region", "IEEE Journal of Quantum Electronics", Feb. 1, 2012, DOI: 10.1109/JQE.2011.2165317, pp. 87-98, vol. 48, No. 2.

B. Imran Akca et al., "Toward Spectral-Domain Optical Coherence Tomography on a Chip", "IEEE Journal of Selected Topics in Quantum Electronics", May 1, 2012, pp. 1223-1233, vol. 18, No. 3.

Authorized Officer: Braun, P, International Search Report and Written Opinion issued in PCT application No. PCT/IB2017/055876, dated Jan. 24, 2018, 12 pp.

Milos Nedeljkovic et al., "Mid-Infrared Silicon-on-Insulator Fourier-Transform Spectrometer Chip", "IEEE Photonics Technology Letters", Feb. 15, 2016, DOI: 10.1109/LPT.2015.2496729, pp. 528-531, vol. 28, No. 4.

B. Imran Akca, "Design of a compact and ultrahigh-resolution Fourier-transform spectrometer", "Optics Express", Jan. 23, 2017, Publisher: Optical Society of America, vol. 25, No. 2, http://dx.doi.org/10.1364/OE.25.001487.

Authorized Officer: Schmidt, Charlotte, International Search report and Written Opinion issued in PCT application No. PCT/IB2017/055873, dated Jan. 16, 2018, 11 pp.

Non-Final Rejection received dated Jun. 23, 2020 U.S. Appl. No. 16/336,067.

* cited by examiner

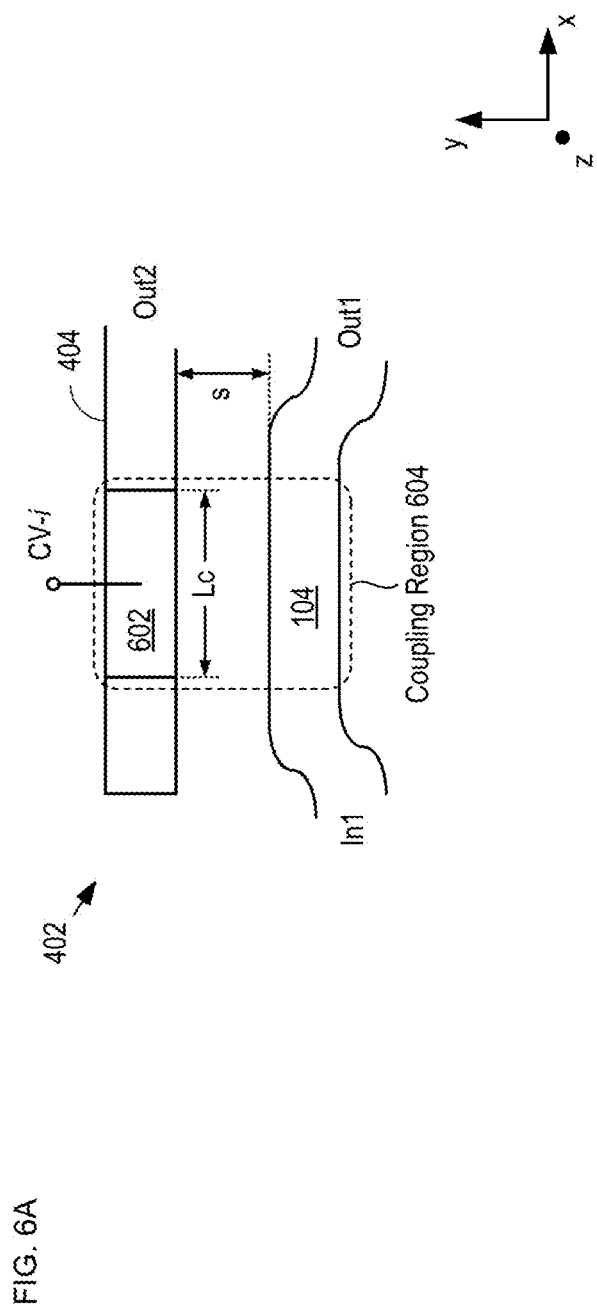
FIG. 6A
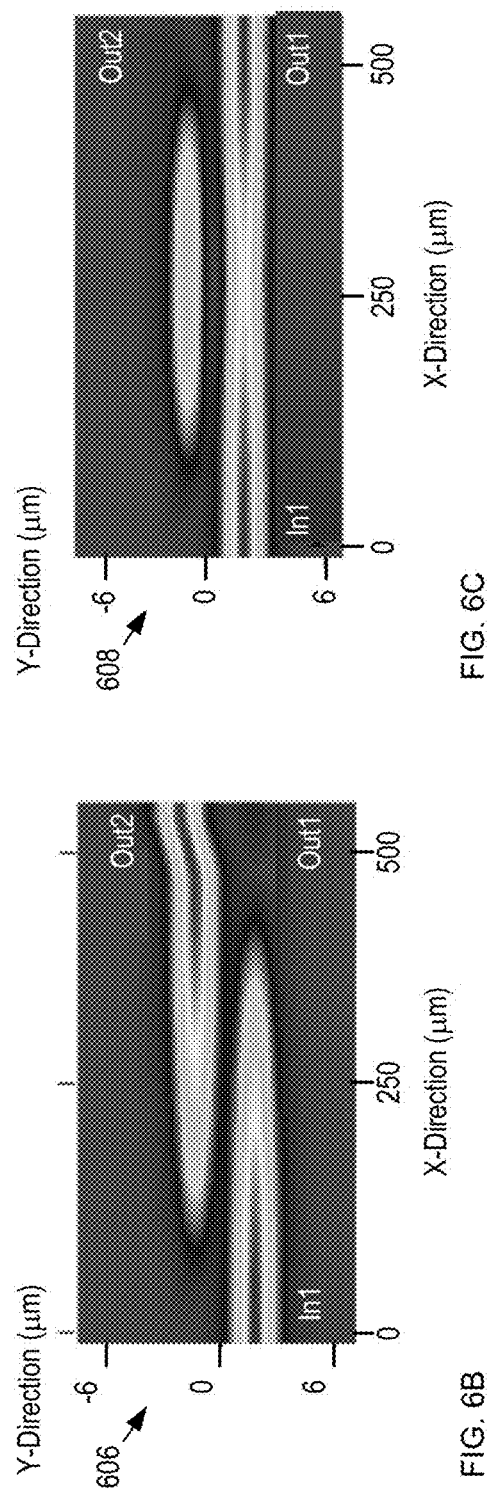
FIG. 6B
FIG. 6C

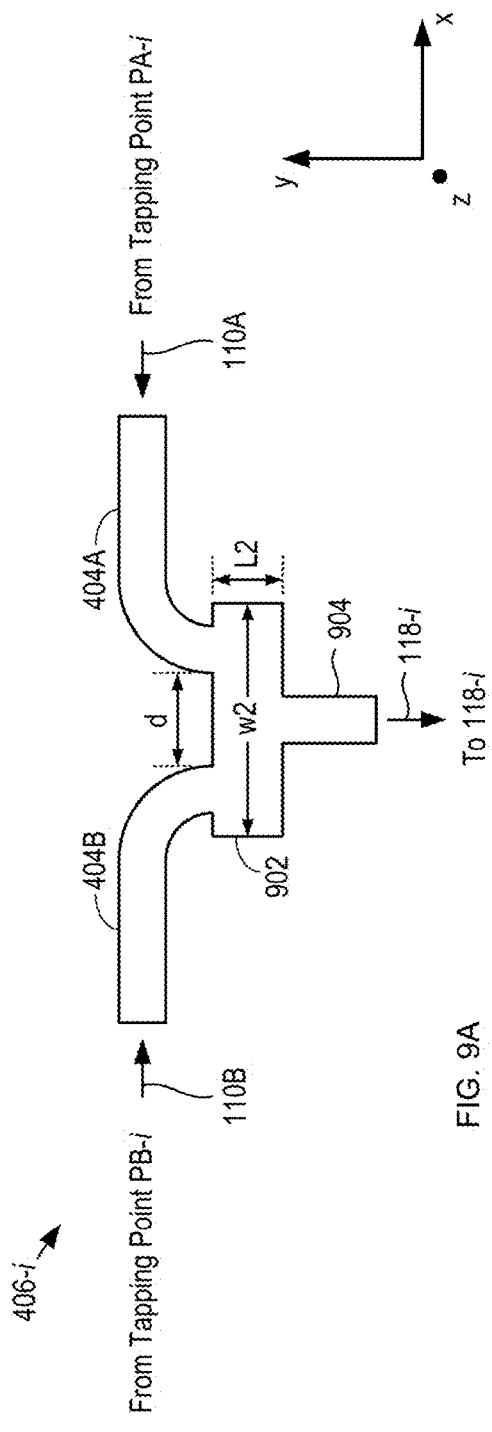
FIG. 9A
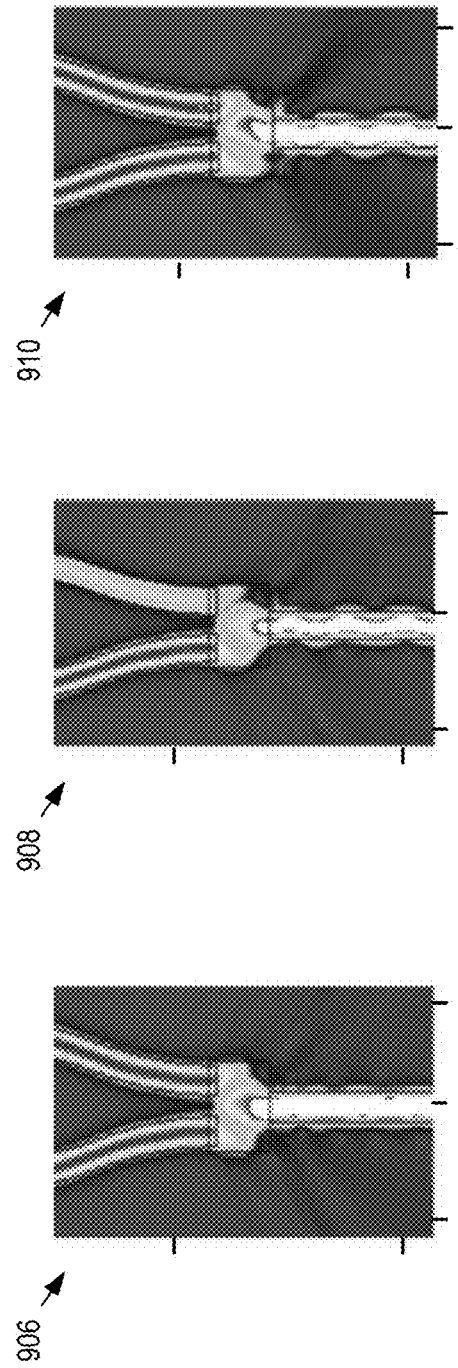
FIG. 9B
FIG. 9C
FIG. 9D

HIGH-RESOLUTION INTEGRATED-OPTICS-BASED SPECTROMETER

CROSS REFERENCE TO RELATED APPLICATIONS

This case claims priority of U.S. Provisional Patent Application Ser. Nos. 62/399,729, filed Sep. 26, 2016 and 62/399,771, filed Sep. 26, 2016, each of which is incorporated herein by reference. If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to spectrometers in general, and, more particularly, to integrated-optics-based spectrometers.

BACKGROUND OF THE INVENTION

An optical spectrometer is a system used to characterize the spectrum of a light signal by determining its intensity at a plurality of wavelengths included in the light signal. The spectral characteristics of the light signal can be used to determine, among other things, the chemical or structural composition of a sample under test. As a result, spectrometers have become essential tools in many application areas, such as biochemical sensing, material analysis, optical communication, and medical diagnostics. Unfortunately, most conventional optical spectroscopy systems are large, bulky, and expensive, which has limited their use where portability is desirable (e.g., for use on-scene at a car accident site, in-the-field analysis of meat and/or produce quality, evaluation of grape ripeness on the vine, etc.).

A number of approaches have been proposed for reducing the size and cost of an optical spectrometer. Integrated-optics technology is seen as a particularly promising candidate technology for enabling very compact spectrometers and could be the key to the development of a practical spectrometer integrated on a single chip. Furthermore, integrated-optics systems can be integrated with microfluidic systems, enabling an on-chip spectrometer that could increase lab-on-a-chip functionality.

An integrated-optics system includes one or more optical waveguides formed on the surface of a substrate. The optical waveguides can be combined in myriad arrangements (often referred to as planar-lightwave circuits (PLCs)) to provide complex optical functionality. Each of these "surface waveguides" (sometimes referred to herein as simply "waveguides") includes a light-guiding core surrounded by cladding material, which substantially confines the light signal conveyed by the surface waveguide to the core material.

Several integrated-optics-based "micro-spectrometers" have been developed based upon different configurations. Unfortunately, these prior-art micro-spectrometers typically require wavelength dispersive components whose spectral resolution scales inversely with optical path length; therefore, such systems are inevitably large.

Fourier-transform spectroscopy (FTS), however, uses interference, rather than dispersion, to measure the spectral content of a light signal. Typically, FTS systems are based on a Michelson-interferometer arrangement, in which a light signal is split into a pair of substantially identical light signals that are reflected from a stationary mirror and a moving mirror, respectively. The reflected light signals are then recombined, leading to interference between the two light signals. This interference generates an "interferogram," which is detected synchronously with the motion of the mirror. The spatial modulation of the interferogram is a function of the displacement of the moving mirror. Using a Fourier transform, the spatial modulation is converted into the spectral content of the signal. FTS is an attractive technique because its output has high signal-to-noise ratio (SNR) and can have high resolution that is relatively constant over a large spectral region.

Unfortunately, while FTS systems can be relatively compact, their need for a scanning mirror limits their speed, which is an important consideration in many applications. An interferometric Fourier-transform technique based on a modified Michelson interferometer approach, spatial-heterodyne spectroscopy (SHS), has been developed, however, which overcomes this limitation. SHS avoids the need for a moving mirror and relies, instead, on analysis of stationary interference patterns. To date, the SHS concept has been successfully implemented only in bulk optics; however, a PLC-based Fourier-transform arrayed waveguide grating (FT-AWG) micro-spectrometer has been proposed by Cheben, et al., in "Wavelength-dispersive device based on a Fourier-transform Michelson-type arrayed waveguide grating," Opt. Lett., Vol. 30, pp. 1824-1826 (2005). In addition, an integrated-optics-based SHS system comprising an array of Mach-Zehnder interferometers (MZI) was proposed by Florjanczyk, et al., in "Multiaperture planar waveguide spectrometer formed by arrayed Mach-Zehnder interferometers," Opt. Express. Vol. 15, pp. 18176-18189 (2007). Even though such approaches show promise, however, they require very long delay lines to achieve sufficiently high resolution. Furthermore, the proposed system employs a set of independent MZI arrangements, each having a different phase delay. As a result, the system occupies an inordinate amount of chip real estate and can be difficult, if not impossible, to fabricate on a single substrate.

The need for a compact, single-chip spectrometer that is capable of high resolution measurements remains, as yet, unmet in the prior art.

SUMMARY OF THE INVENTION

The present invention enables a high-resolution spectrometer disposed on a single chip, where the entire system occupies only a small chip footprint. Embodiments of the present invention include integrated-optics waveguide arrangements that have a pair of long waveguide busses whose lengths are digitally controlled. These waveguide busses can function as part of the sample and reference arms for each of a plurality of MZIs. Each MZI is reversibly optically coupled with the sample and reference busses in a manner that gives rise to a different path-length difference for each MZI. Each MZI provides an output signal based on its path-length difference, which is digitally processed using a Fourier transform to determine the spectral content of a light signal provided to the system. Embodiments of the present invention are particularly well suited for use in optical coherence spectroscopy, Raman spectroscopy, and the like.

Like SHS systems in the prior art, the present invention employs an array of independently addressable MZIs, where each MZI is characterized by a different path-length difference between its two arms. In contrast to the prior art, however, the present invention realizes the MZI array in a compact layout by employing a waveguide arrangement in which the MZIs share at least a portion of the same surface waveguides. As a result, each MZI does not require a complete set of surface waveguides. In other words, the MZI array is "nested" such that each successive MZI "builds" onto a large fraction of the waveguide arrangement of its preceding MZI.

An illustrative embodiment of the present invention is a spectrometer comprising first and second arms into which an input light signal is distributed as a sample signal and a reference signal. The first and second arms, a plurality of coupling-waveguide pairs and a plurality of waveguide-switch pairs collectively define a plurality of MZIs that are characterized by different path-length differences between their respective sample and reference arms.

The first arm functions as a sample bus that includes a portion of the sample arm of each MZI and is a substantially straight waveguide that includes a series of uniform-length straight waveguide portions. Each s-bend portion contributes a constant increment of waveguide length to the sample arm of each successive MZI.

The second arm functions as a reference bus that includes a portion of the reference arm of each MZI. The reference bus is a non-linear waveguide that includes a series of uniform-length "s-bend" portions. Each s-bend portion contributes a constant increment of waveguide length to the reference arm of each successive MZI, where the length increment contributed by each s-bend portion is longer than its corresponding straight portion by path-length difference, α.

Each MZI also includes an interference section that comprises a pair of waveguide-switches, a pair of substantially identical coupling waveguides, a beam combiner, and a photodetector. The interference sections of the MZIs are sequentially arranged along the sample and reference busses such that each interference section of the sequence can be reversibly optically coupled with the sample and reference busses, via its waveguide switches, at constant intervals along each bus—specifically, at each intersection between the straight portions of the sample bus and each intersection between the s-bend portions of the reference bus. As a result, each interval includes one straight portion of the sample bus and one s-bend portion of the reference bus. The sample signal and reference signal are coupled from the sample and reference busses into the coupling waveguides of the interference section and conveyed to the beam combiner. At the beam combiner, they are recombined as an interference signal. The interference signal is detected by the photodetector, which provides an output signal from the interferometer based on the intensity of the interference signal, which is based on the path-length difference of the MZI that includes that interference section.

When an interference section is optically coupled with the sample and reference busses, the sample arm of its corresponding MZI includes the portion of the sample bus up to the interference section plus one of the coupling waveguides, while the reference arm of its corresponding MZI includes the portion of the reference bus up to the interference section plus the other one of the coupling waveguides. As a result, each MZI in the plurality of MZIs is characterized by a different path-length difference between its sample and reference arms, where the difference increases by path-length difference, cc, from one MZI to the next.

The output signals from the plurality of MZIs collectively define a power distribution as a function of path-length difference. The power distribution is digitally processed using a Fourier transform to determine the spectral characteristics of the input light signal.

In some embodiments, at least one beam combiner is a two-mode-interference beam combiner that recombines the sample and reference signals based on two-mode interference.

In some embodiments, at least one of the waveguide switches is an electro-optically switched directional coupler. In some embodiments, an electro-optically switched directional coupler is a 1×2 switch that is operative for directing an input light signal into either of two output ports such that the light signal is switched completely to that output port.

An embodiment of the present invention is an integrated-optics-based optical spectrometer comprising: a coupler for distributing an input light signal into a first light signal and a second light signal; a plurality of Mach-Zehnder interferometers (MZIs), each comprising: (i) a sample path operative for conveying the first light signal, the sample path having a first length; (ii) a reference path operative for conveying the second light signal, the reference path having a second length; (iii) a beam combiner that optically couples the sample path and the reference path, the beam combiner being operative for combining the first light signal and second light signal to generate an interference signal after the first light signal has propagated through the sample path and the second light signal has propagated through the reference path; and (iv) a photodetector for providing an output signal that is based on the optical power of the interference signal; wherein the plurality of MZIs is nested; wherein each MZI of the plurality thereof is characterized by a different path-length difference between its respective first length and second length; and wherein the plurality of MZIs is integrated on a single substrate.

Another embodiment of the present invention is a method for estimating the spectral content of an input light signal, the method comprising: distributing the input light signal into a first light signal and a second light signal; generating an output signal at each of a plurality of nested interferometers that is disposed on a substrate, each interferometer of the plurality thereof being a Mach-Zehnder interferometer, wherein each interferometer of the plurality thereof includes: (i) a sample path having a first length; (ii) a reference path having a second length; (iii) a beam combiner that is operative for combining the first light signal and second light signal into an interference signal that is based on a path-length difference between the first length and the second length; and (iv) a photodetector for providing the output signal based on the optical power of the interference signal; and estimating the spectral content of the input light signal based on the plurality of output signals; wherein each interferometer of the plurality thereof is characterized by a unique path-length difference.

BRIEF DESCRIPTION OF THE DRAWINGS

FIG. 6A depicts a schematic drawing of a top view of a waveguide switch in accordance with the illustrative embodiment.

FIGS. 6B-C show simulations of the coupling relationship in switch 402 in its ON and OFF states, respectively.

FIG. 9A depicts a schematic drawing of a beam coupler in accordance with the illustrative embodiment.

FIGS. 9B-D show BPM simulation results for beam combiner 406-i.

DETAILED DESCRIPTION

Figure 1:
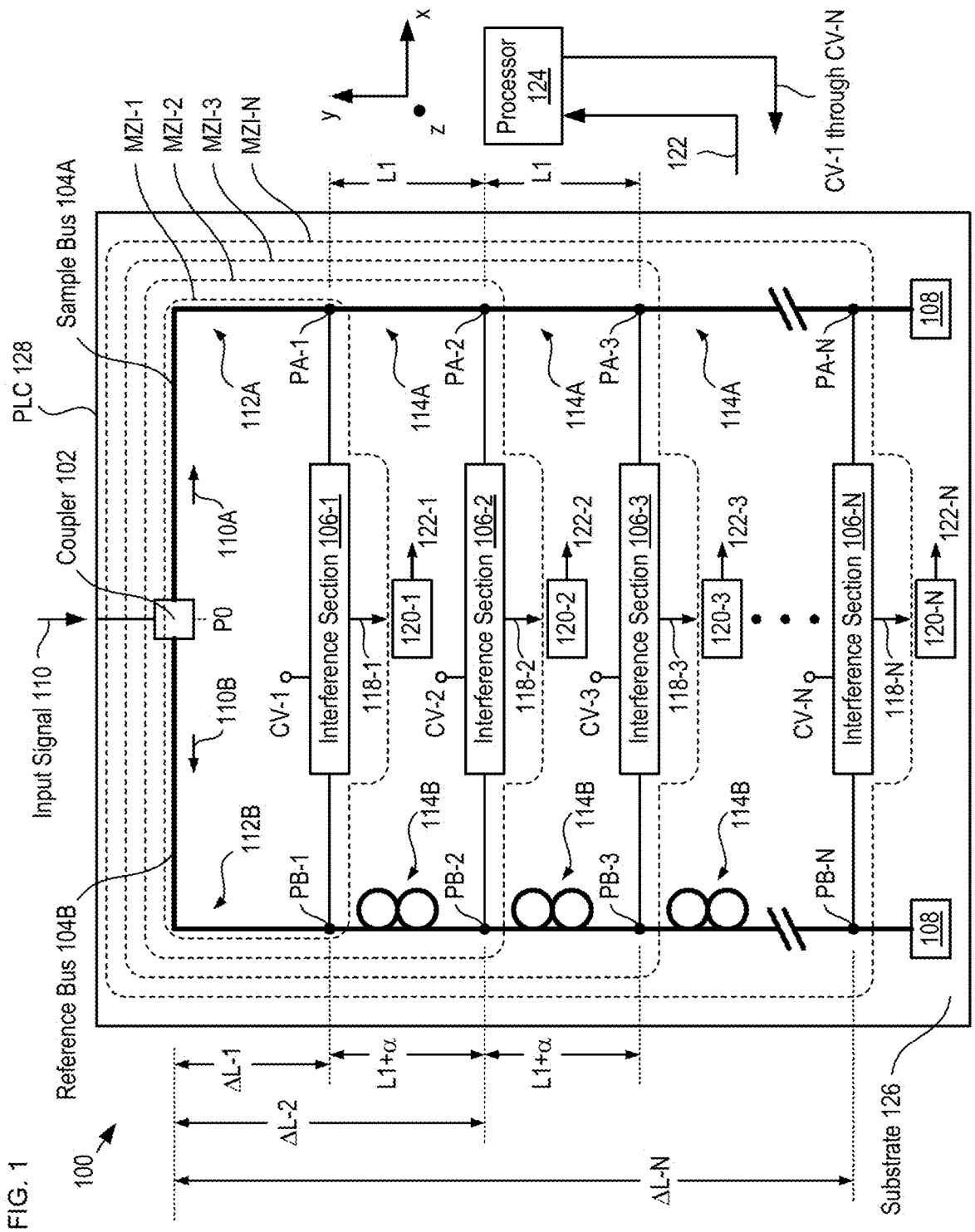
FIG. 1 depicts a schematic diagram of an integrated-optics-based spectrometry system in accordance with an illustrative embodiment of the present invention.

FIG. 1 depicts a schematic diagram of an integrated-optics-based spectrometry system in accordance with an illustrative embodiment of the present invention. System 100 includes PLC 128, photodetectors 120-1 through 120-N, and processor 124.

Figure 2:
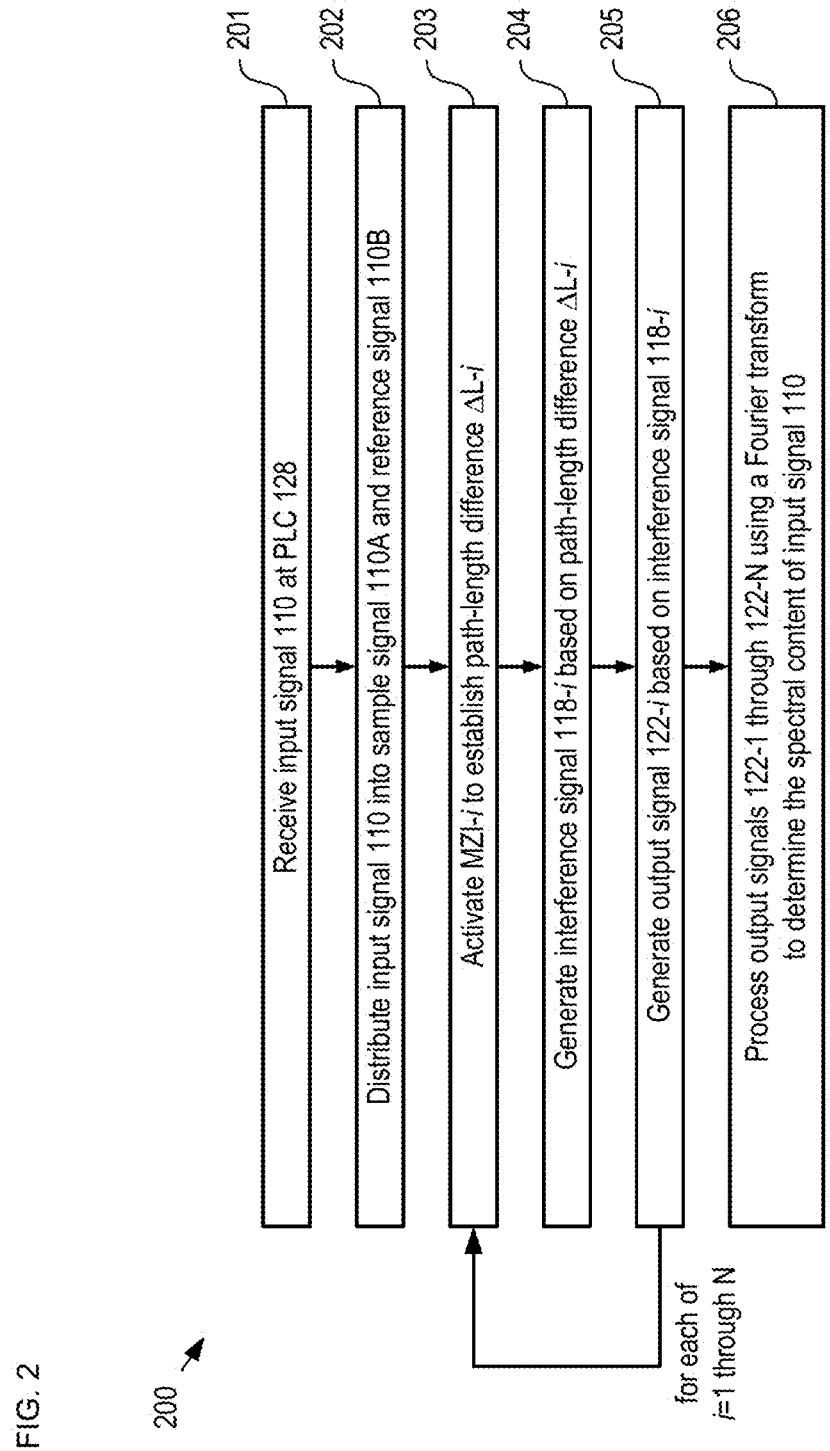
FIG. 2 depicts operations of a method suitable for performing optical spectroscopy in accordance with the illustrative embodiment.

FIG. 2 depicts operations of a method suitable for performing optical spectroscopy in accordance with the illustrative embodiment. Method 200 begins with operation 201, where light signal is received at PLC 128.

PLC 128 includes coupler 102, sample bus 104A, reference bus 104B, interference sections 106-1 through 106-N, and beam dumps 108, all of which are monolithically integrated on substrate 126.

At operation 202, input signal 110 is distributed into sample signal 110A and reference signal 110B at coupler 102. In the depicted example, system 100 is designed for high-resolution operation for a light signal having a center wavelength of approximately 800 nm; however, other operating wavelengths can be used without departing from the scope of the present invention. It should be noted that the terms "sample" and "reference" are applied to the structure and signals of system 100 merely to provide a distinction between the separate paths through the system.

Coupler 102 is a conventional 3-dB directional coupler that is dimensioned and arranged to receive input signal 110 at its input port and distribute the input signal equally into sample bus 104A and reference bus 1046 as sample signal 110A and reference signal 110B. In some embodiments, coupler 102 is a different optical-power-splitting element, such as a y-coupler, etc. In some embodiments, the split ratio of coupler 102 is other than 50:50. In some embodiments, coupler 102 includes an element, such as a spotsize converter, lens, etc., at its input port to mitigate coupling loss. In some embodiments, coupler 102 receives input signal 110 via an edge coupler, a vertical-grating coupler, and the like. In some embodiments, coupler 102 receives input signal 110 from an external element, such as an optical fiber, a bulk lens, a lensed optical fiber, a high-numerical-aperture fiber, the output port of a photonic-integrated circuit (PIC) or PLC, etc.

Each of sample bus 104A and reference bus 104B is a ridge waveguide that extends from coupler 102 to a conventional beam dump 108, which terminate each bus in a manner that mitigates back reflections. The total length of sample bus 104A and reference bus 104B is selected based on that required to attain the desired spectral resolution for system 100.

Figure 3A:
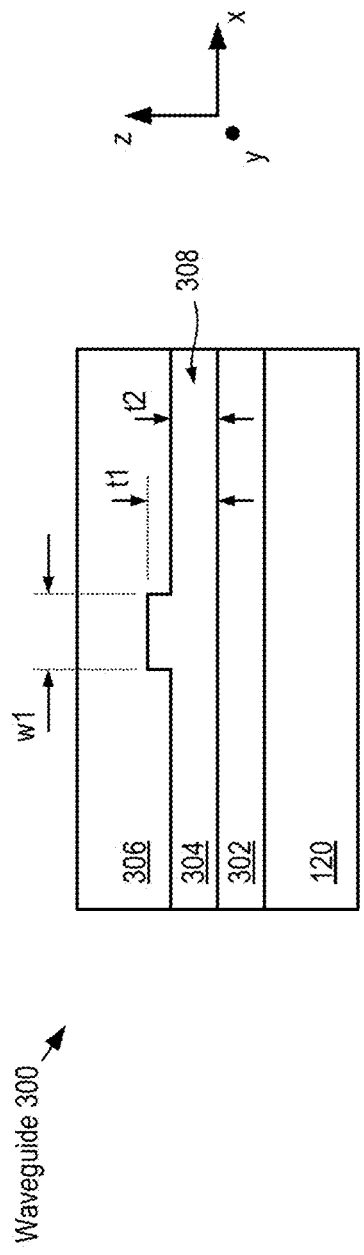
FIG. 3A depicts a schematic drawing of a cross-sectional view of a surface waveguide in accordance with the illustrative embodiment.

FIG. 3A depicts a schematic drawing of a cross-sectional view of a surface waveguide in accordance with the illustrative embodiment. Waveguide 300 includes lower cladding 302, core 304, and upper cladding 306, all of which are disposed on substrate 126. Waveguide 300 is representative of the surface waveguide structure of each of sample bus 104A and reference bus 104B.

In the depicted example, core 304 comprises lithium niobate and each of lower cladding 302 and upper cladding 306 comprises silicon dioxide; however, one skilled in the art will recognize, after reading this Specification, that myriad materials (e.g., silicon nitride, silicon, compound semiconductors, glasses, silicon oxides, etc.) can be used in the core and cladding layers of waveguide 300 without departing from the scope of the present invention.

Substrate 126 is a conventional silicon substrate. In some embodiments, substrate 126 comprises a suitable material other than silicon, such as a different semiconductor, glass, lithium niobate, a silicon compound (e.g., silicon germanium, silicon carbide, etc.), and the like.

Lower cladding 302 is a layer of silicon dioxide having a thickness of approximately 3 microns.

Core 304 is a layer of light-guiding material 308, which has been sculpted to define a single-mode ridge-waveguide structure whose ridge portion has a width, w1, of approximately 900 nm and a thickness, t1, of approximately 250 nm. The slab regions of the ridge-waveguide structure have a thickness, t2, of approximately 200 nm.

In the depicted example, material 308 is lithium niobate (LN) characterized by a refractive index of approximately 2.25 at a wavelength of 800 nm and an electro-optic coefficient of approximately 30 pm/V.

Upper cladding 306 is a layer of silicon dioxide having a thickness of approximately 500 nm.

It should be noted that, although the illustrative embodiment comprises surface waveguides that are single-mode ridge waveguides, surface waveguides having different propagation characteristics, geometries, structures, and/or materials can be used in embodiments of the present invention without departing from the scope of the present invention.

Figure 3B:
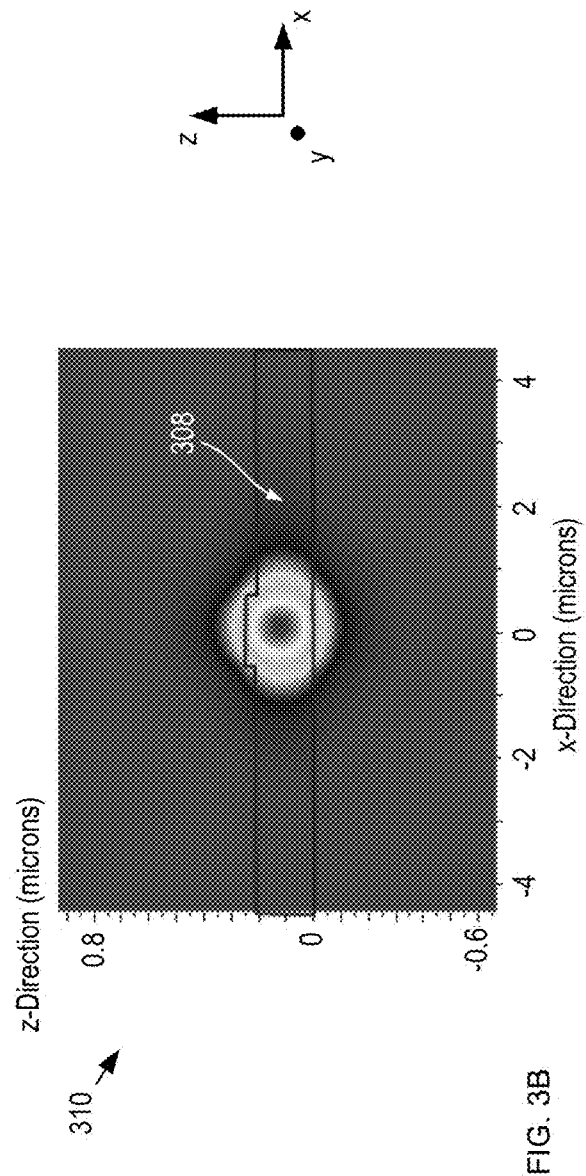
FIG. 3B shows a simulated cross-sectional beam profile of the propagation mode of input signal 110 within waveguide 300.

FIG. 3B shows a simulated cross-sectional beam profile of the propagation mode of input signal 110 within waveguide 300. The result depicted in plot 310 was generated using a conventional beam-propagation method (BPM). Simulation results for the exemplary waveguide 300 predict a minimum bending radius of approximately 150 microns, above which the waveguide will exhibit negligible bending loss. The present invention exploits the tight bending radii possible for waveguide 300 in some embodiments to enable single-chip, integrated-optics-based spectrometers that can be significantly more compact than those achievable in the prior art.

System 100 is dimensioned and arranged to define a plurality of individually addressable Mach-Zehnder interferometers MZI-1 through MZI-N, wherein each is characterized by a unique path-length difference between the lengths of its sample and reference arms. Each interferometer MZI-i, where i=1 through N, includes a portion of sample bus 104A, a portion of reference bus 104B, and interference section **106-*i*. As discussed below, each interferometer MZI-i receives sample signal 110A and reference signal 110B from coupler 106 and provides output signal 122-*i***, whose magnitude is based on interference of the light signals that arises due to the unique path-length difference of the interferometer.

Interferometers MZI-1 through MZI-N are sequentially arrayed along the lengths of sample bus 104A and reference bus 104B such that they are "nested" within the chip footprint of system 100. For the purposes of this Specification, including the appended claims, the term "nested interferometers" is defined as a plurality of interferometers that is sequentially arranged along commonly shared sample and reference busses such that each interferometer in the sequence has sample and reference arms that include and extend the sample and reference busses of the preceding interferometer. As a result, portions of each of the sample bus and reference bus are shared by all interferometers in the sequence.

It is an aspect of the present invention that "nesting" the MZIs enables them to share (and reuse) portions of the same sample and reference arms (i.e., sample bus 104A and reference bus 104B), thereby avoiding the need to duplicate surface waveguides that serve substantially the same purpose in each MZI. Nesting the MZIs, therefore, makes it possible to fit the entire waveguide arrangement of system 100 in a much smaller chip footprint, which enables the monolithic integration of all of the waveguides of the sample bus, reference bus, and interference sections on a single substrate.

Interferometers MZI-1 through MZI-N are nested in system 100 by employing a plurality of substantially identical interference sections that is arranged in a sequence along the lengths of the sample and reference busses. As discussed below, each of interferometers MZI-1 through MZI-N can be selectively activated by optically coupling its respective interference section to sample bus 104A and reference bus 104B at its respective tapping points PA-i and PB-i, respectively, and optically decoupling the remainder of the MZIs from the sample and reference busses.

Figure 4:
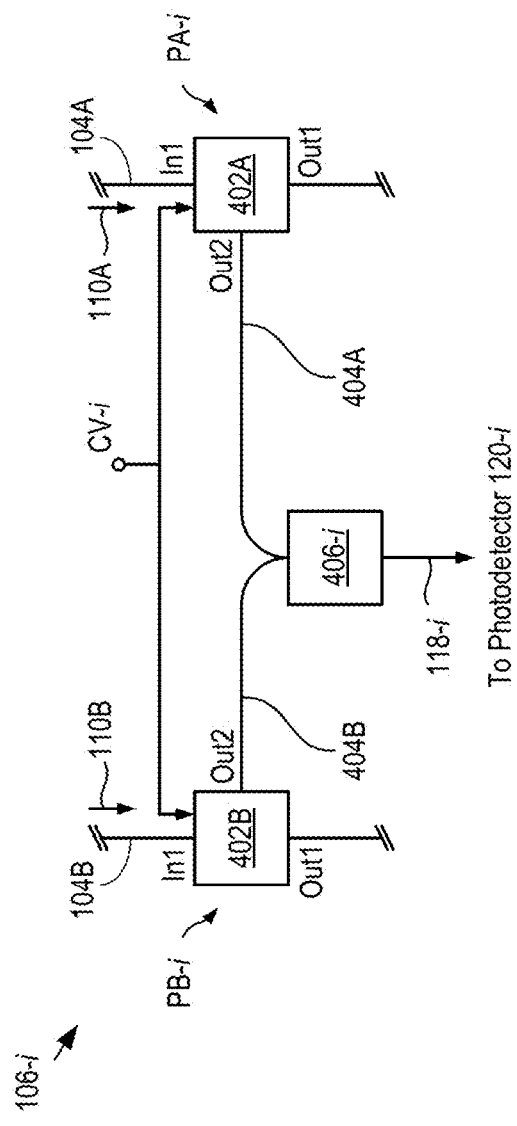
FIG. 4 depicts a schematic drawing of an interference section in accordance with the illustrative embodiment.

FIG. 4 depicts a schematic drawing of an interference section in accordance with the illustrative embodiment. Interference section **106-*i* includes switches 402A and 402B, coupling waveguides 404A and 404B, and beam combiner 406-*i*. Interference section 106-*i* is representative of each of interference sections 106-1 through 106-N**.

Each of switches 402A and 402B is a 1×2 waveguide switch that is operative for receiving a light signal at its input port, In1, and directing it to either of its two output ports, Out1 and Out2. The output port to which the light signal is directed is based on the magnitude of control voltage CV-i applied to the switch. Switch 402A is located at tapping point PA-i and switch 402B is located at tapping point PB-i. A representative waveguide switch is described in detail below and with respect to FIGS. 6A-C and 7.

Each of coupling waveguides 404A and 404B is analogous to waveguide 300 described above and with respect to FIG. 3A. Coupling waveguides 404A and 404B have substantially the same length. Coupling waveguides 404A and 404B are operative for conveying sample signal 110A and reference signal 110B, respectively, to beam combiner **406-*i*** with low propagation loss.

Beam combiner **406-*i* is a beam combiner operative for recombining sample signal 110A and reference signal 110B to generate interference signal 118-*i* and provide it to photodetector 120-*i*. In the depicted example, beam combiner 406-*i* is based on two-mode interference (TMI); however, other beam combiners can be used in interference section 106-*i* without departing from the scope of the present invention. A representative beam combiner in accordance with the illustrative embodiment is described in detail below and with respect to FIGS. 9A-D**.

Returning now to FIG. 1, when activated by processor 124, each interferometer MZI-i has a sample arm that includes the length of coupling waveguide 404A and the portion of sample bus 104A between origin P0 and its respective tapping point PA-i, and a reference arm that includes the length of coupling waveguide 404B and the portion of reference bus 104B between origin P0 and its respective tapping point PB-i. It should be noted that each of switches 402A and 402B also contribute slightly to the path lengths of the sample and reference arms of each MZI, but since these lengths are very short and substantially identical, their contributions are not included in this analysis.

Tapping points PA-1 through PA-N are uniformly separated along sample bus 104A by substantially identical waveguide portions 114A. Tapping points PB-1 through PB-N are uniformly separated along reference bus 104B by substantially identical waveguide portions 114B. In some embodiments, at least one set of tapping points (i.e., tapping points PA-1 through PA-N and tapping points PB-1 through PB-N) is spaced non-uniformly along its respective waveguide bus.

Figures 5A, 5B:
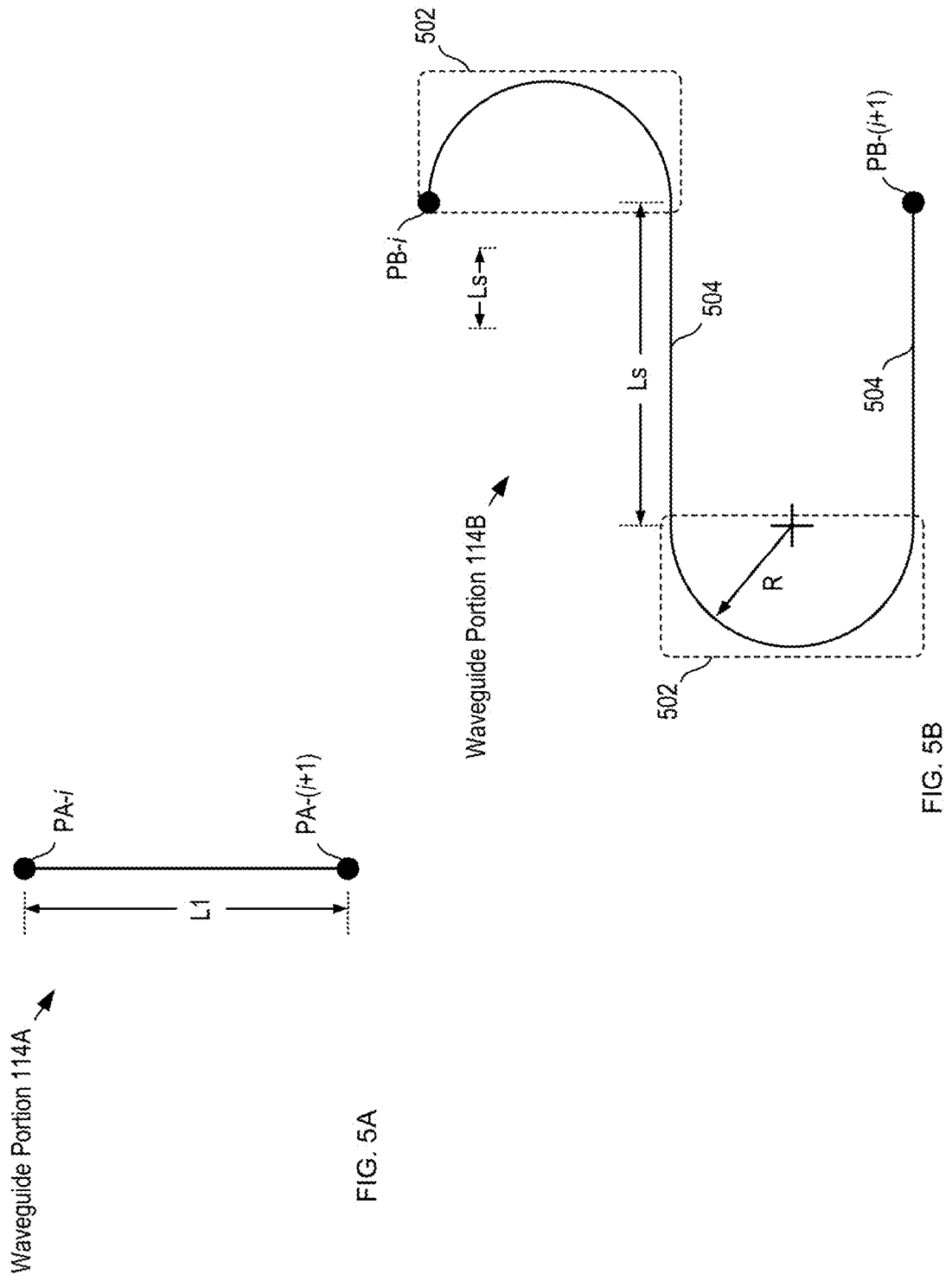
FIG. 5A depicts a schematic drawing of waveguide portion 114A in accordance with the illustrative embodiment.
FIG. 5B depicts a schematic drawing of waveguide portion 114B in accordance with the illustrative embodiment.

FIG. 5A depicts a schematic drawing of waveguide portion 114A in accordance with the illustrative embodiment. Waveguide portion 114A is a substantially straight waveguide section having a length L1. In some embodiments, at least one of waveguide portions 114A has a shape other than a straight line.

FIG. 5B depicts a schematic drawing of waveguide portion 114B in accordance with the illustrative embodiment. Waveguide portion 114B is a serpentine waveguide section that includes two half-circle waveguide portions 502, each having radius R and two straight waveguide portions 504, each having length Ls. The overall length of waveguide portion 114B, therefore, is equal to (2πR)+2Ls. In some embodiments, at least one of waveguide portions 114B has a shape other than serpentine, such as curved, spiral, irregular, etc.

One skilled in the art will recognize, after reading this Specification, that the inclusion of one or more straight waveguide portions 504 in waveguide portion 114B provides design flexibility by contributing significantly to optical path length, while the inclusion of one or more curved waveguide portions 502 in waveguide portion 114B enables a compact device size—even for designs capable, of inducing very long optical delays. In other words, the compactness of embodiments of the present invention a greater maximum change in length, $\Delta L_{max}$, which, in turn, enables better spectral resolution than can be achieved in prior-art single-chip integrated-optics-based spectrometers.

The dimensions of waveguide portions 114A and 114B are selected such that waveguide portion 114B has an overall length of L1+α. As a result, α is equal to (2πR+2Ls)−L1.

Because the path-length difference increases between successive MZI increases by α, interferometer MZI-N is characterized by the maximum path-length difference, $\Delta L_{max}$, of system 100. Typically, the number of MZI stages included in system 100 is selected based on the desired resolution of system 100, which is defined by the maximum delay attainable in the system, which is based on $\Delta L_{max}$. One skilled in the art will recognize that $\Delta L_{max}$ also dictates the overall size required for the spectrometer. The calculation of $\Delta L_{max}$ refers to the Littrow condition and is defined by:

$$\Delta L_{max} = \frac{\lambda_0^2}{\delta\lambda \times n_e}$$

where δλ is the spectral resolution of the spectrometer, $n_e$ is the effective refractive index of waveguide 300, and $\lambda_0$ is the center wavelength of the operating range of interest.

In the depicted example, $\lambda_0$ is 800 nm and an operating range of 15 GHz with wavelength resolution of 500 MHz or better is desired; therefore, $\Delta L_{max}$ is approximately 30 cm. To achieve this performance, system 100 includes 60 MZI stages (i.e., N=60), which enables the desired wavelength range and spectral resolution (in accordance with Nyquist sampling theory). In the depicted example, therefore, α is equal to approximately 500 nm. It should be noted, however, that any of $\Delta L_{max}$, N, and α can have any practical value without departing from the scope of the present invention.

One skilled in the art will recognize that such a large path-length difference is difficult, if not impossible, to achieve using prior-art integrated-optics spectrometer approaches, since prior-art arrangements capable of achieving it would likely be too large to fit on a single substrate. The present invention, on the other hand, enables a more compact waveguide arrangement that can achieve such large path-length delays.

The path-length differences of interferometers MZI-1 through MZI-N increase sequentially by an integer multiple of the same fixed path length difference, a, which is equal to $\Delta L_{max}/N$. It should be noted that, while preferable, it is not necessary that the path-length differences of interferometers MZI-1 through MZI-N are evenly spaced.

Returning now to method 200, at operation 203, for each of i=1 through N, processor 124 sequentially activates each interferometer MZI-i to establish a sequence of path-length differences, ΔL-1 through ΔL-N. It should be noted that it is preferred that the MZIs are sequentially activated; however, they can be activated in any order without departing from the scope of the present invention. Each interferometer MZI-i is activated by turning on the waveguide switches included in its respective interference section 106-i and turning off the waveguide switches included in all of the other interference sections. As a result, the only interference section optically coupled with the sample and reference busses is that of the activated MZI and all other interference sections are effectively removed from system 100.

One skilled in the art will recognize, after reaching this Specification, that operation 203 performs a function that is substantially a digital alternative to the continuous mirror scans described above used in prior-art FTS systems. In the present invention, however, the resultant path-length differences are discrete values determined by the fixed waveguide layout of system 100. This affords embodiments of the present invention several advantages over such prior-art systems. First, system 100 is subject to virtually no variation in the resultant path-length differences from scan to scan (i.e., the scanning system is substantially noise free). In the prior art, on the other hand, environmental effects, such as shock, vibration, temperature changes, etc., as well as the difficulty of maintaining parallelism between the numerous mirror surfaces of a Michelson interferometer can give rise to significant measurement noise. Second, system 100 is a solid-state system and the path lengths of sample bus 104A and reference bus 104B can be changed in less than 10 microseconds, which is orders of magnitude faster than the speed at which a physical mirror can be scanned.

FIG. 6A depicts a schematic drawing of a top view of a waveguide switch in accordance with the illustrative embodiment. Waveguide switch 402 (referred to herein as "switch 402") is an electro-optically switched directional coupler that includes bus 104 (which is representative of a portion of either of sample bus 104A and reference bus 104B), coupling waveguide 404 (which is representative of either of coupling waveguides 404A and 404B), and electrode 602. The operation of switch 402 is representative of the operation of each of waveguide switches 402A and 402B. Although the illustrative embodiment includes waveguide switches that operate via the electro-optic effect, it will be clear to one skilled in the art, after reading this Specification, how to specify, make, and use alternative embodiments that include waveguide switches that rely on a different phase-tuning effect, such as thermo-optic, piezoelectric, stress-induced, liquid-crystal-based, and the like.

Bus 104 and coupling waveguide 404 are separated by separation s, which is small enough to enable evanescent coupling between the waveguides. In the depicted example, s=1 micron. Although the illustrative embodiment comprises bus and coupling waveguides that are coplanar, in some embodiments, these waveguides are arranged in a vertical configuration.

Electrode 602 is a layer of electrically conductive material that is disposed on the top of coupling waveguide 404. The thickness of top cladding 306 is typically selected, in part, to mitigate propagation loss due to interaction with electrode 602. In the depicted example, electrode 602 is a layer of gold having a thickness of approximately 100 nm. Electrode 602 has length Lc, which defines the length of coupling region 404. In the depicted example, Lc=320 microns; however, other electrode lengths can be used without departing from the scope of the present invention. It should be noted that, although electrode 602 is disposed on the coupling waveguide in the depicted switch configuration, in some embodiments it is disposed on bus 104.

In the depicted example, switch 402 has a normally on switch configuration. For the purposes of this Specification, including the appended claims, the term "normally on" is defined as that, when control voltage CV-i=0 V, a switch is in its ON state in which the light signals in both the bus waveguide and coupling waveguide are in phase and, as a result, light propagating through bus 104 in coupling region 604 evanescently couples completely from the bus waveguide into coupling waveguide 404. When control voltage CV-i=0, therefore, light entering bus 104 at input port In1 exits switch 402 at output port Out2.

To actuate switch 402 and put it into its "OFF" (i.e., non-cross-coupled or "bar") state, the magnitude of control voltage CV-i is changed to $CV_{OFF}$, where $CV_{OFF}$ is the voltage at which a π phase difference is induced between the light signals in bus 104 and coupling waveguide 404 by increasing the effective refractive index of coupling waveguide 404 in coupling region 604 via the electro-optic effect. The relative change in the refractive indices of the waveguides gives rise to a phase difference between the light signals propagating through them. Due to the π phase difference between them, no cross-coupling of the light signals in the bus and coupling waveguides occurs. As a result, light entering bus 104 at input port In1 bypasses switch 402, remaining in the bus waveguide, and proceeds to output port Out1.

For the switch architecture of switch 402, the relationship between effective index (for the TE-polarization mode) is given by:

$$\Delta n(VC) = \frac{1}{2} n_e^3 r_{33} \frac{V}{t_1} \Gamma$$

where $n_e$ is the effective index of bus 104 for TE-polarized light, $\Gamma$ is an overlap factor, t1 is the thickness of bus 104, and $r_{33}$ is the electro-optic coefficient. In the depicted example, $n_e$=2.0, $\Gamma$=0.25, $r_{33}$=30 pm/V, and $t_1$=250 nm, which yields an expected change in refractive index of approximately $12\times10^{-5}\times CV$.

FIGS. 6B-C show simulations of the coupling relationship in switch 402 in its ON and OFF states, respectively. Plot 606 shows the cross-coupling that occurs between bus 104 and coupling waveguide 404 when CV-i=0. Plot 608 shows that no cross-coupling occurs between bus 104 and coupling waveguide 404 when CV-i=$CV_{OFF}$, which is equal to approximately 18 V in the depicted example.

Switch 402 is preferably designed such that, in each of its ON and OFF states, its coupling ratio is substantially stable across the entire spectral bandwidth for which operation of system 100 is desired. In the depicted example, the optical bandwidth is approximately 10 GHz. It should be noted, however, that any non-uniformity in the coupling ratio of any of the switches in interference sections 106-1 through 106-N can be accounted for through calibration.

Furthermore, it should be noted that switch 402 is designed so that substantially all of the optical power of sample signal 110A and reference signal 110B is coupled into the coupling waveguide when the switches are actuated to effect the desired path-length difference in the MZI in which they are included. This enables system 100 to have extremely low optical attenuation, which makes it very attractive for applications in which input signal 110 is weak.

One skilled in the art will recognize that there is a trade-off between the length of electrode 602 and the voltage required to fully actuate switch 402 (i.e., induce a complete $\pi$ phase shift in coupling waveguide 404). The relationship between electrode length and required voltage is given by:

$$Lc = \frac{\lambda_0}{2x\Delta n(CV)},$$

where $\lambda_0$ is the center waveguide of input signal 110.

Figure 7:
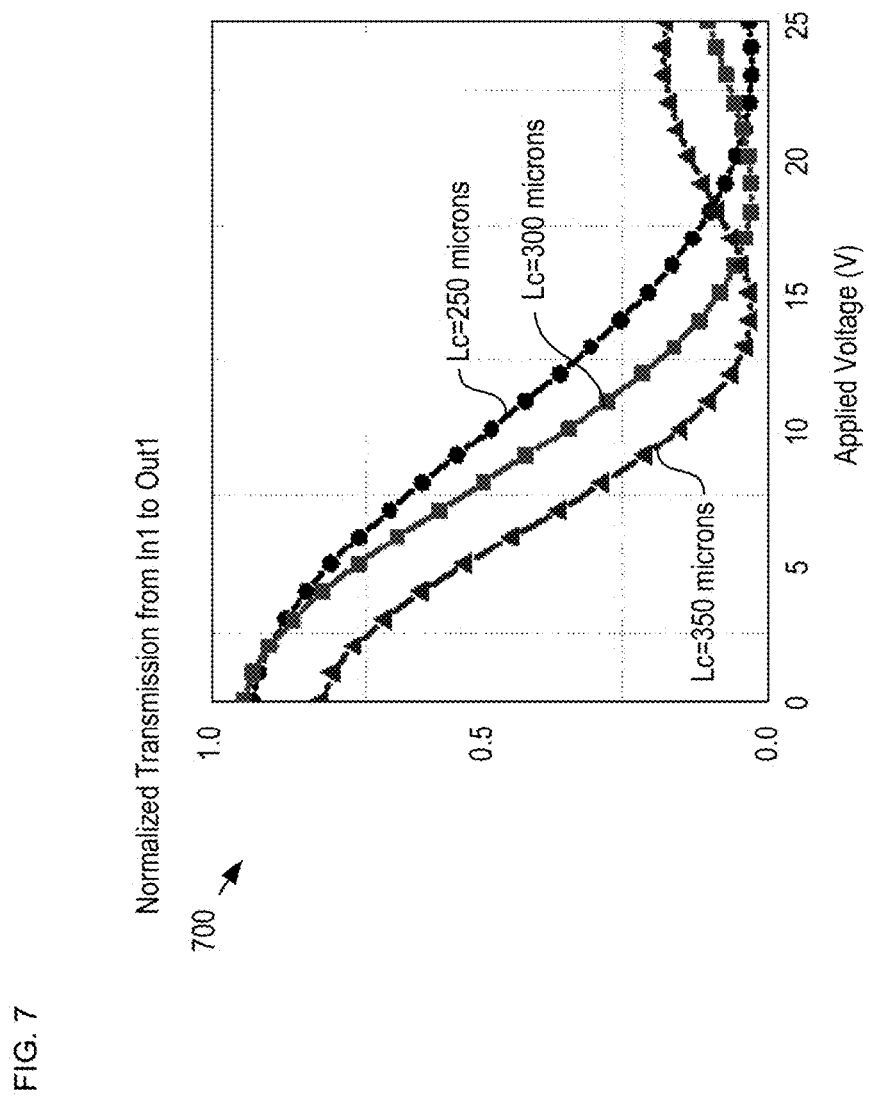
FIG. 7 depicts measured transmission through switch 402 for different control voltages and electrode lengths.

FIG. 7 depicts measured transmission through switch 402 for different control voltages and electrode lengths. Plot 700 indicates that, for the arrangement shown in FIG. 6A, the best performance was obtained for an electrode length of 300 microns at an applied voltage CV of approximately 18 Volts.

As a result, when processor 124 provides interference section 106-i a CV-i of 0V, substantially the entirety of sample signal 110A is optically coupled from sample bus 104A into coupling waveguide 404A via switch 402A and substantially the entirety of reference signal 110B is optically coupled from reference bus 104B into coupling waveguide 404B via switch 402B.

As noted, switches 402A and 402B transfer all of the optical energy from sample bus 104A and reference bus 104B into coupling waveguides 404A and 404B, respectively. As a result, in some embodiments, turning off the waveguide switches of the interference sections of interferometers MZI-(i+1) through MZI-N is optional when interferometer MZI-i is activated because no optical energy of sample signal 110A and reference signal 110B remains in the sample and reference busses past tapping points PA-i and PB-i; therefore, nothing can couple into subsequent interference sections even if their switches are in their ON states.

Figure 8A:
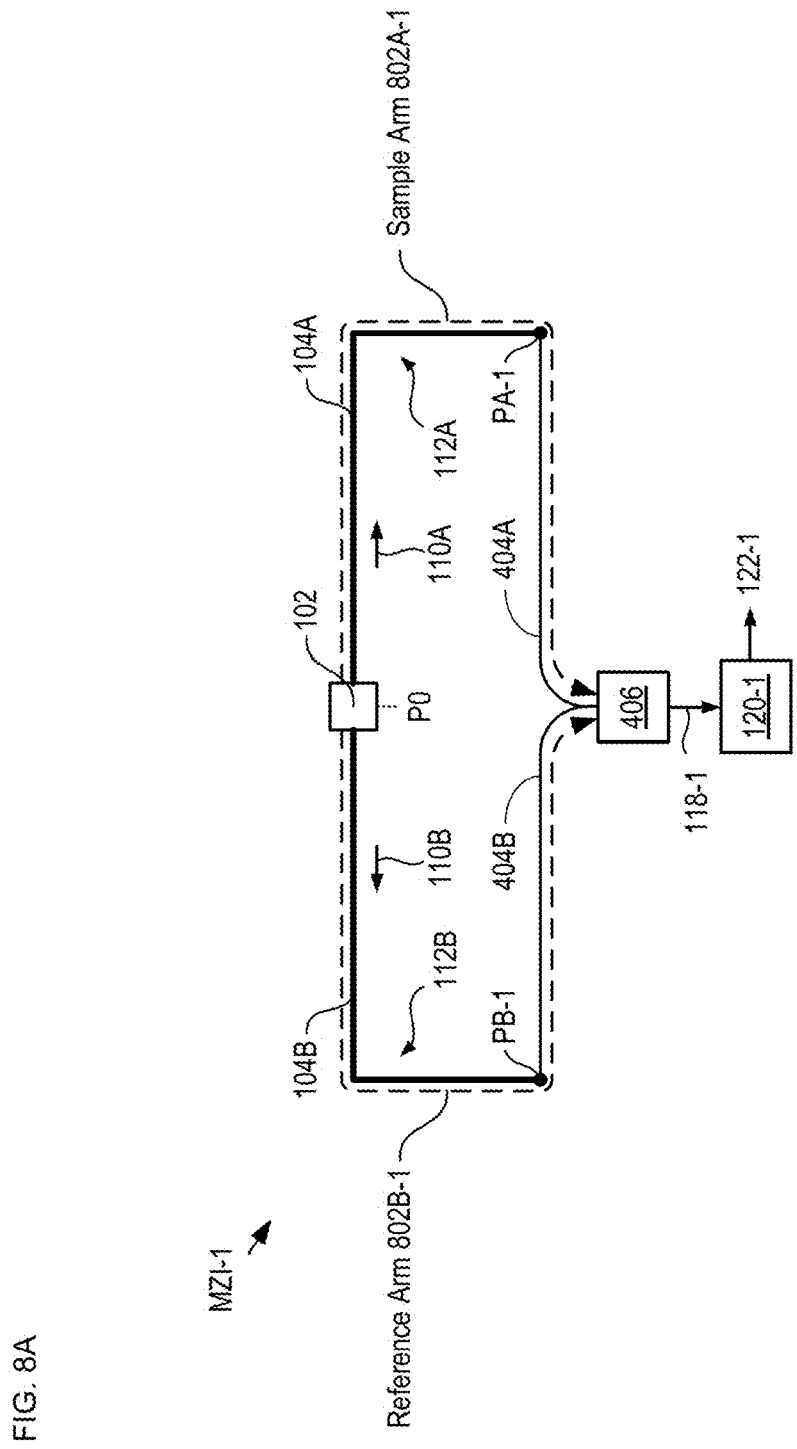
FIGS. 8A and 8B depict schematic drawings of the architecture of system 100 when configured with interferometers MZI-1 and MZI-3, respectively.

FIG. 8A depicts a schematic drawing of the architecture of system 100 when interferometer MZI-1 is activated. When interferometer MZI-1 is activated, its sample arm 802A-1 includes waveguide portion 112A (i.e., the portion of sample bus 104A that extends from origin P0 to tapping point PA-1) plus the length of coupling waveguide 404A, while its reference arm 802B-1 includes waveguide portion 112B (i.e., the portion of sample bus 104B that extends from origin P0 to tapping point PB-1) plus the length of coupling waveguide 404B.

In system 100, the path lengths of each of coupling waveguides 404A and 404B are equal and the distance between origin P0 and tapping point PA-1 is equal to the distance between origin P0 and tapping point PB-1. As a result, sample arm 802A-1 and reference arm 802B-1 are of equal length and $\Delta L$-1 is equal to 0.

Figure 8B:
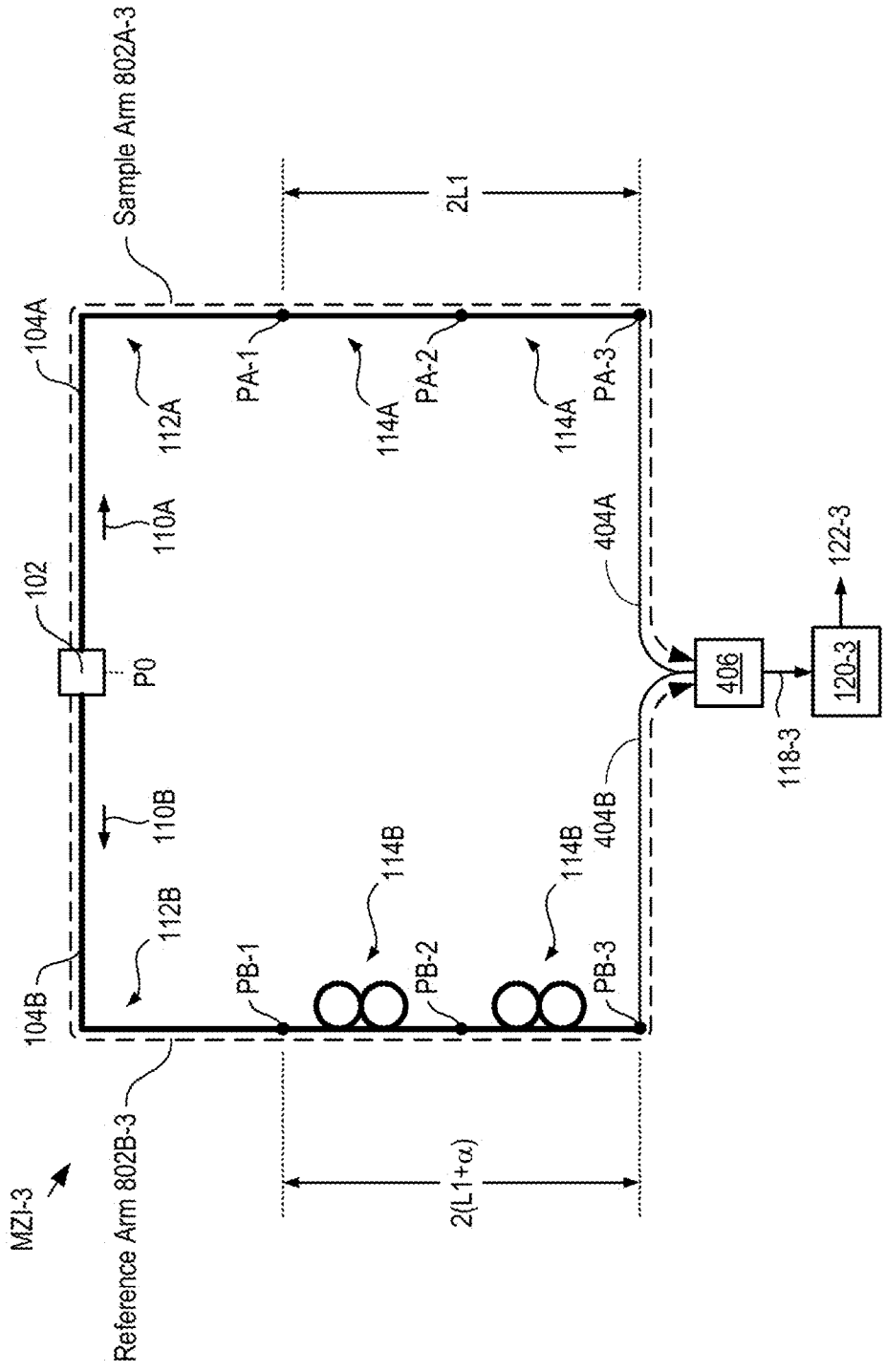

FIG. 8B depicts a schematic drawing of the architecture of system 100 when interferometer MZI-3 is activated. When interferometer MZI-3 is activated, its sample arm 802A-3 includes the portion of sample bus 104A that extends from origin P0 to tapping point PA-3 and the length of coupling waveguide 404A, while its reference arm 802B-3 includes the portion of reference bus 104B that extends from origin P0 to tapping point PB-3 and the length of coupling waveguide 404B. Its sample arm, therefore, includes wavelength portion 112A plus two waveguide portions 114A, while its reference arm includes wavelength portion 112B plus two waveguide portions 114B. As a result, the path-length difference of interferometer MZI-3 is equal to 2a (twice the difference between the lengths of wavelength portions 114A and 114B).

At operation 204, for each of i=1 through N, sample signal 110A and reference signal 110B are combined at beam combiner 406-i to generate interference signal 118-i.

FIG. 9A depicts a schematic drawing of a beam coupler in accordance with the illustrative embodiment. Beam combiner 406-i comprises slab 902 and output waveguide 904, each of which is analogous to waveguide 300 described above and with respect to FIGS. 3A-B. Beam combiner 406-i is representative of each of the beam combiners included in interference sections 106-1 through 106-N.

Slab 902 is a region of a waveguide structure analogous to that of waveguide 300, but which is dimensioned and arranged to recombine the light signals conveyed by coupling waveguides 404A and 404B and provide the recombined light signal to output waveguide 904 as interference signal 118-i. Slab 902 has width, w2, and length, L2, which are selected to enable two-mode interference (TMI) within the slab region. The structure of beam combiner 406-i is preferred over a more-conventional Y-junction because it is more fabrication tolerant and, therefore, its performance is more reproducible. In the depicted example, w2 is 3 microns, L1 is 15 microns, and coupling waveguides 404A and 404B are separated by separation distance, d, which is 0.9 micron.

FIGS. 9B-D show BPM simulation results for beam combiner 406-i. The radiation loss of the beam combiner is dependent on the phase difference between sample signal 110A and reference signal 110B, as received at slab 902, as well as their relative power.

Plot 906 shows the coupling of the light signals when sample signal 110A and reference signal 110B are in phase and have equal power. As seen in the plot, all input power is coupled into the first-order even mode and, therefore, transmitted through slab region 902 into output waveguide 904. It is estimated that, in this case, beam combiner 406-$i$ will provide interference signal 118-$i$ having approximately 96% of the optical power received from coupling waveguides 404A and 404B. In other words, the minimum optical loss through the beam combiner is approximately 4%.

Plot 908 shows the coupling of the light signals when sample signal 110A and reference signal 110B are in phase and have a power ratio of 0.5. This power disparity gives rise to a power reduction of only 2%, relative to the equal power case depicted in plot 906 (i.e., interference signal 118-$i$ has approximately 94% of the optical power received from coupling waveguides 404A and 404B).

Plot 910 shows the coupling of the light signals when sample signal 110A and reference signal 110B have a phase difference of $\pi/6$. In this case, the output power of interference signal 118-$i$ is reduced to approximately 91% of the combined optical power of sample signal 110A and reference signal 110B (i.e., a reduction of 5% from the in-phase, equal power case depicted in plot 800).

At operation 205, for each of i=1 through N, photodetector 120-$i$ detects interference signal 118-$i$ and provides output signal 122-$i$ to processor 124. Preferably, photodetectors 120-1 through 120-N are fabricated on substrate 126 such that they are monolithically integrated with the surface waveguides of system 100. In some embodiments, however, the photodetectors are integrated in hybrid fashion by bonding them on top of the system and coupling them to their respective output waveguides 704 (e.g., via vertical grating couplers). In some embodiments, the photodetectors are external devices that are optically coupled with output waveguides 704 via conventional butt coupling methods.

Photodetectors 120-1 through 120-N are conventional photodetectors operative for providing output signals 122-1 through 122-N (referred to, collectively, as output signals 122) such that each output signal has a magnitude that is based on the optical power of its respective interference signal 118-$i$. In some embodiments, each of the photodetectors is formed directly on substrate 126 such that it is monolithically integrated with the waveguides of sample bus 104A, reference bus 104B, and interference sections 106-1 through 106-N. In some embodiments, the photodetectors are bonded on the surface of substrate 126 and optically coupled with output waveguides 704 via grating couplers. In some embodiments, output waveguides 704 extend to the edge of substrate 126 to form output facets and the photodetectors are disposed on another substrate and butt coupled with the output facets (with or without intermediate optics, such as lenses, lensed fibers, spotsize converters, etc.).

Method 200 continues by incrementing i and repeating operations 203 through 205 for each of i=1 through N, to generate a complete set of N optical power measurements that correspond to the N path-length differences generated in system 100.

At operation 206, processor 124 digitally processes the set of N optical power measurements (i.e., output signals 122-1 through 122-N) using a Fourier transform to determine the spectral content of input signal 110.

Processor 124 is a conventional instrument controller and processing system operative for providing control signals to interference sections 106-1 through 106-N and receiving output signals from photodetectors 120-1 through 120-N (referred to, collectively, as photodetectors 120). Typically, processor 124 is also operative for processing the output signals received from PLC 128 to develop an estimate of the structure at object point 136 of sample 134.

Figure 10:
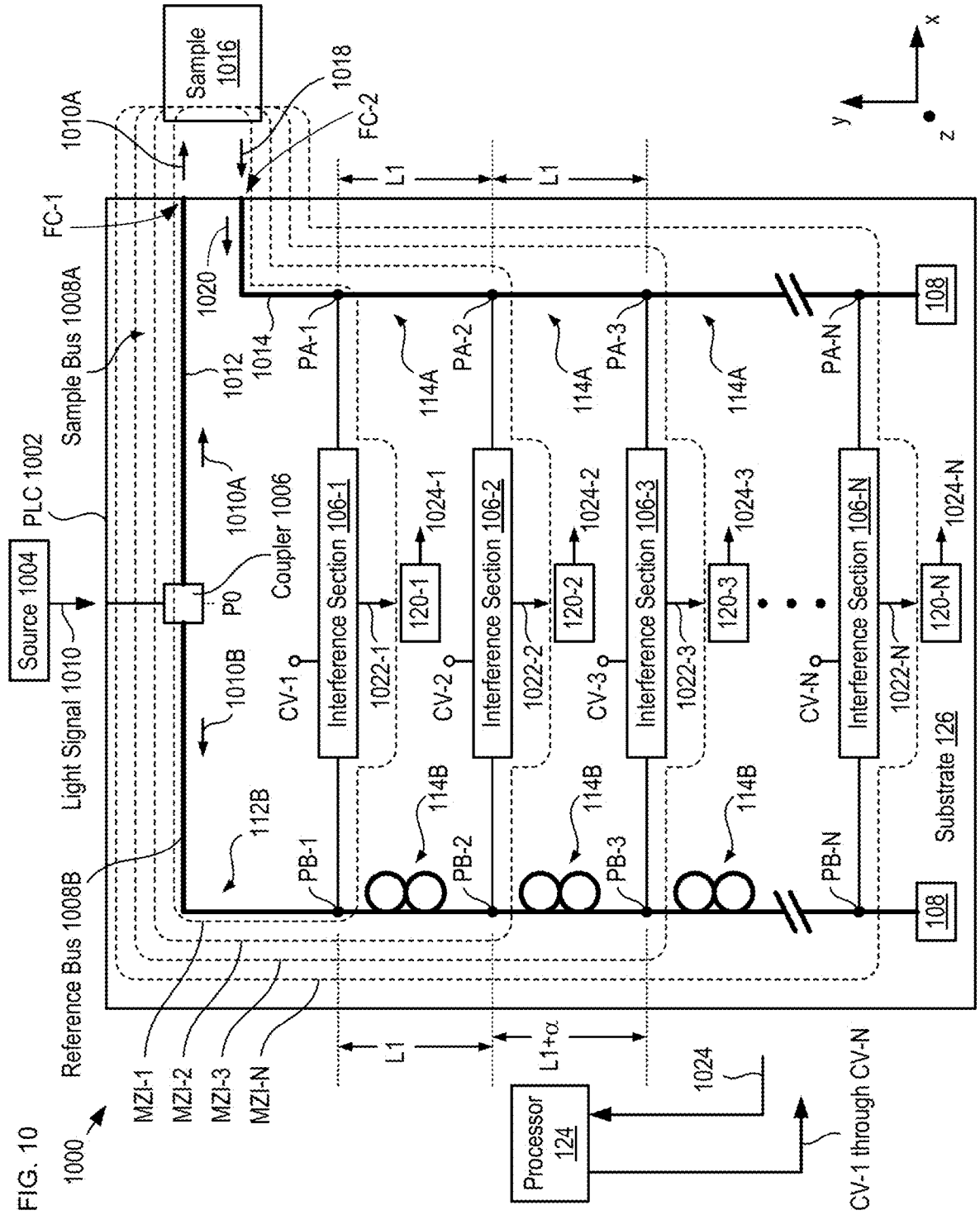
FIG. 10 depicts a schematic drawing of an optical coherence tomography system in accordance with an alternative embodiment of the present invention.

FIG. 10 depicts a schematic drawing of an optical coherence tomography system in accordance with an alternative embodiment of the present invention. System 1000 includes PLC 1002, source 1004, photodetectors 120-1 through 120-N, and processor 124.

PLC 1002 includes coupler 1006, sample bus 1008A, reference bus 1008B, interferometers MZI-1 through MZI-N, and beam dumps 108, all of which are monolithically integrated on substrate 126. PLC 1002 is analogous to PLC 128 described above and with respect to FIG. 1; however, in PLC 1002, sample bus 1008A includes a portion of a sample under test, as well as a short free-space region between the PLC and the sample.

Source 1004 is a broadband light source that is operative for providing light signal 1010 to coupler 1006.

Coupler 1006 is analogous to 3-dB coupler 106 described above; however, coupler 1006 splits light signal 1010 such that 80% of its light propagates in sample bus 1008A as sample signal 1010A and 20% of its light propagates in reference bus 1008B as reference signal 1010B.

Sample bus 1008A is analogous to sample bus 104A described above and with respect to FIG. 1; however, sample bus 1008A is separated into interrogation waveguide 1012 and return waveguide 1014, which include output facet FC-1 and input facet FC-2, respectively. Output facet FC-1 is operative for launching sample signal 1010A toward sample 1016 as a free-space light signal. In similar fashion, input facet FC-2 is operative for coupling free-space light reflected from the sample into return waveguide 1014 as return signal 1020, where the return signal 1020 is based on the surface and sub-surface structure of the interrogated region of sample 1016. Preferably, facets FC-1 and FC-2 are located in close proximity to one another to mitigate optical loss.

It should be noted that sample bus 1008A also includes the portion of sample 1016 interrogated by sample signal 1010A, as well as the short free-space region between sample 1016 and facets FC-1 and FC-2. This free-space region represents a negligible portion of sample bus 1008A, however, and, therefore, is not included in this analysis.

In similar fashion to that described for in system 100, interference sections 106 of interferometers MZI-1 through MZI-N are reversibly optically coupled with sample bus 1008A at uniform intervals of L1 (i.e., the length of waveguide portion 114A) and with reference bus 1008B at uniform intervals of L1+$\alpha$ (i.e., the length of waveguide portion 1148).

In operation, imaging of sample 1016 at different depths comprises sequentially activating interferometers MZI-i, where i=1 through N, which incrementally increases the difference between the path length of the reference bus and the sample bus for consecutive interferometers by a, combines reference signal 1010B with its respective reflected signal 1020, and generates interference signal 1022-$i$.

Output signals 122-1 through 122-N are then processed by processor 124 to determine the surface and sub-surface structure of sample 1016.

In accordance with Nyquist sampling theory, it is preferable that path-length difference a be less than or equal to one-half of the axial resolution desired for system 1000. In the depicted example, therefore, to enable an axial resolution of 20 microns, the path-length difference between waveguide portions 114A and 114B is selected as 10 microns (neglecting the round-trip distance within sample 1016, etc.). One skilled in the art will recognize that, while there is no restraint on the magnitude of L1, smaller values enable more compact devices.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus including a single-chip integrated-optics-based optical spectrometer, wherein the spectrometer comprises:
    a coupler for distributing an input light signal into a first light signal on a sample bus and a second light signal on a reference bus;
    a plurality of nested interferometers, each interferometer of the plurality thereof being a Mach-Zehnder interferometer that includes:
        (i) a sample path operative for conveying the first light signal, the sample path having a first length and including a portion of the sample bus;
        (ii) a reference path operative for conveying the second light signal, the reference path having a second length and including a portion of the reference bus;
        (iii) an interference section that includes a beam combiner that is operative for combining the first light signal and second light signal into an interference signal; and
        (iv) a photodetector for providing an output signal that is based on the optical power of the interference signal;
    wherein each interferometer of the plurality thereof is characterized by a different path-length difference between its respective first length and second length.

2. The apparatus of claim 1 further comprising a processor that is operative for generating an estimate of the spectral content of the input light signal based on the plurality of output signals.

3. The apparatus of claim 2 wherein the processor is operative for performing a Fourier transform based on the plurality of output signals, and wherein the estimate is based on the Fourier transform.

4. The apparatus of claim 1 wherein at least one beam combiner of the plurality thereof is operative for combining the first light signal and second light signal based on two-mode interference.

5. The apparatus of claim 1 wherein the spectrometer has a resolution that is less than or equal to 500 MHz.

6. The apparatus of claim 1 wherein the plurality of interferometers is characterized by a sequence of path-length differences that are different integer multiples of a first path-length difference.

7. The apparatus of claim 1 wherein each interference section of the plurality thereof is reversibly optically couplable with the sample and reference busses, and wherein each interference section further comprises: an interference section that includes:
    a first waveguide switch, wherein the first waveguide switch is operative for reversibly optically coupling the interference section with the sample bus at a different one of a plurality of first tapping points on the sample bus; and
    a second waveguide switch, wherein the second waveguide switch is operative for reversibly optically coupling the interference section with the reference bus at a different one of a plurality of second tapping points on the reference bus;
    wherein the sample bus, the reference bus, and the plurality of interference sections are monolithically integrated on a substrate; and
    wherein the plurality of interferometers is configured such each interferometer can be selectively activated.

8. The apparatus of claim 7 wherein the plurality of first tapping points is uniformly distributed along the sample bus and the plurality of second tapping points is uniformly distributed along the reference bus.

9. The apparatus of claim 7 wherein at least one of the first and second waveguide switches is an electro-optically switched directional coupler.

10. The apparatus of claim 1 further comprising a source for providing the input light signal, wherein the sample path includes:
    a first waveguide having a first facet that is dimensioned and arranged to provide the first light signal to a sample; and
    a second waveguide having a second facet that is dimensioned and arranged to receive at least a portion of the first signal from the sample such that the portion includes spectral content that is based on structure of the sample, wherein the second waveguide is optically coupled with the beam combiner.

11. The apparatus of claim 10 further comprising a processor that is operative for generating an estimate of the structure of the sample based on the plurality of output signals.

12. A method for estimating the spectral content of an input light signal, the method comprising:
    distributing the input light signal into a first light signal on a sample bus and a second light signal on a reference bus;
    generating an output signal at each of a plurality of nested interferometers that is disposed on a substrate, each interferometer of the plurality thereof being a Mach-Zehnder interferometer, wherein each interferometer of the plurality thereof is characterized by a unique path-length difference and includes:
        (i) a sample path having a first length and including a portion of the sample bus;
        (ii) a reference path having a second length and including a portion of the reference bus;
        (iii) an interference section that includes a beam combiner that is operative for combining the first light signal and second light signal into an interference signal that is based on a path-length difference between the first length and the second length; and
        (iv) a photodetector for providing the output signal based on the optical power of the interference signal; and
    estimating the spectral content of the input light signal based on the plurality of output signals.

13. The method of claim 12 wherein the spectral content is estimated based on a Fourier transform that is based on the plurality of output signals.

14. The method of claim 12 further comprising providing at least one beam combiner of the plurality thereof such that it is operative for combining the first light signal and second light signal based on two-mode interference.

15. The method of claim 12 wherein the spectral content of the input light signal is estimated with a resolution that is less than or equal to 500 MHz.

16. The method of claim 12 further comprising providing the plurality of interferometers such that the path-length differences of the plurality thereof are different integer multiples of a first path-length difference.

17. The method of claim 12 further comprising:
    providing each interference section of the plurality thereof such that it further includes:

(v) a first waveguide switch that is operative for reversibly optically coupling the interference section with the sample bus at a different one of a plurality of first tapping points on the sample bus; and (vi) a second waveguide switch that is operative for reversibly optically coupling the interference section with the reference bus at a different one of a plurality of second tapping points on the reference bus;

wherein the plurality of interferometers is configured such each interferometer can be selectively activated; and wherein the sample bus, the reference bus, and the plurality of interference sections are monolithically integrated on the substrate.

18. The method of claim 17 further comprising:

providing the plurality of first tapping points such that they are uniformly distributed along the sample bus; and providing the plurality of second tapping points such that it is uniformly distributed along the reference bus.

19. The method of claim 17 further comprising providing at least one waveguide switch of the plurality thereof such that it is an electro-optically switched directional coupler.

* * * * *